United States Patent [19]

Groendal

[11] Patent Number: 4,669,747
[45] Date of Patent: Jun. 2, 1987

[54] FLEXIBLE BICYCLE

[76] Inventor: Mark L. Groendal, 3988 Burlingame, SW., Wyoming, Mich. 49509

[21] Appl. No.: 266,181

[22] Filed: May 22, 1981

[51] Int. Cl.$^4$ .............................................. B62K 9/00
[52] U.S. Cl. .................................................. 280/283
[58] Field of Search .................. 280/274, 275, 281 R, 280/283, 286; 267/149

[56] References Cited

U.S. PATENT DOCUMENTS

| | | | |
|---|---|---|---|
| 441,649 | 12/1890 | Dunlop | 280/275 |
| 701,967 | 6/1902 | Titus | 280/283 |
| 4,102,439 | 7/1978 | Calderazzo . | |
| 4,119,326 | 10/1978 | Porter . | |
| 4,202,561 | 5/1980 | Yonkers | 280/281 R |

FOREIGN PATENT DOCUMENTS

| | | | |
|---|---|---|---|
| 110943 | 5/1928 | Austria | 280/283 |
| 672642 | 10/1963 | Canada | 267/149 |
| 839312 | 3/1939 | France | 280/283 |
| 12901 | of 1887 | United Kingdom | 280/283 |

Primary Examiner—John J. Love
Assistant Examiner—Ross Weaver
Attorney, Agent, or Firm—Mason, Fenwick & Lawrence

[57] ABSTRACT

A bicycle has a front frame portion including a front wheel and handlebars and a rear frame portion including a crank housing, a pedal crank, a rear wheel, and a seat with a flexible fiberglass spring plate removably mounted between upper portions of the front and rear frame portion and a steel cable extending from the crank housing of the rear frame portion to the upper portion of the front frame portion. During operation of the bicycle, the front frame portion can flex with respect to the rear frame portion by flexing the fiberglass spring plate and tensioning the cable against the bias of compression springs holding the cable in tensioned condition. The fiberglass spring plate can be removed and replaced with another plate having different flexibility characteristics for accommodating rider of varying weights.

14 Claims, 9 Drawing Figures

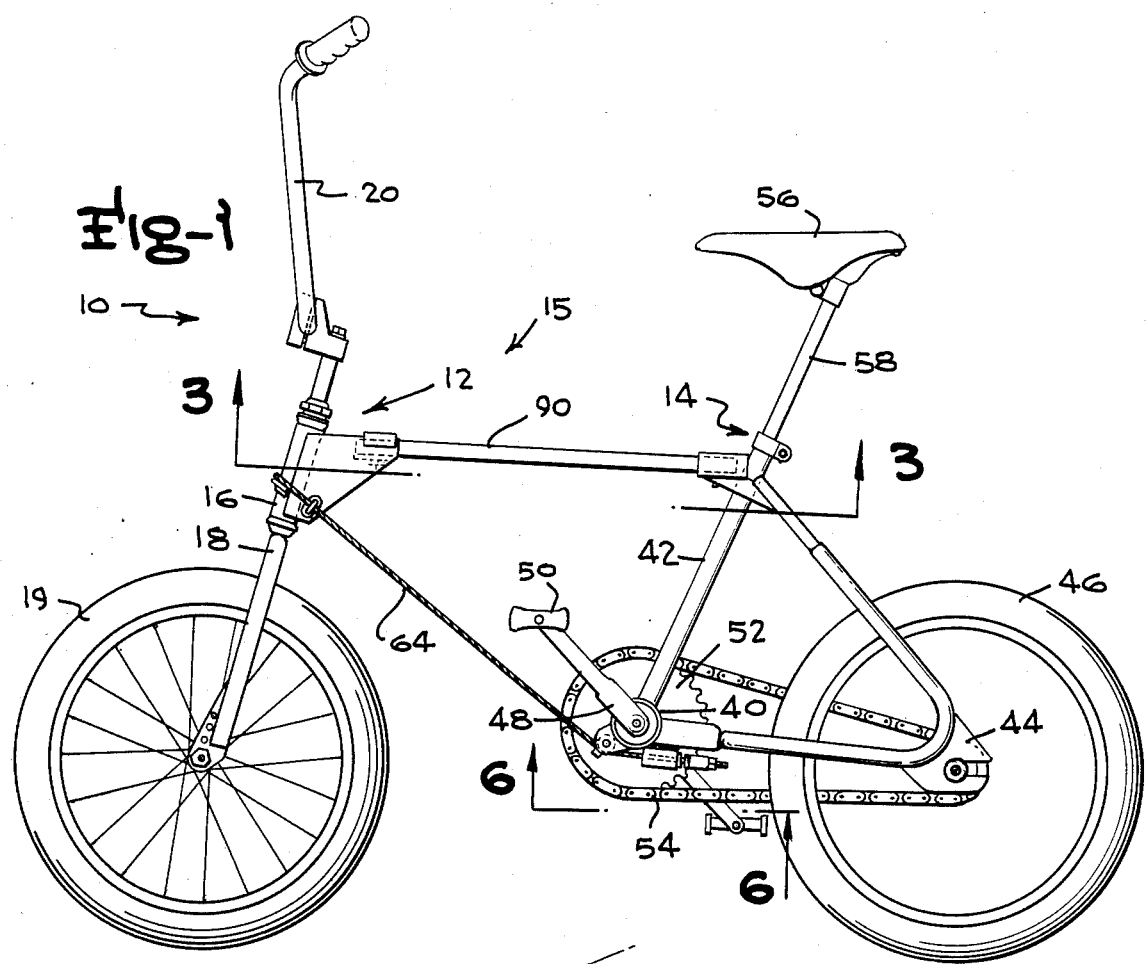
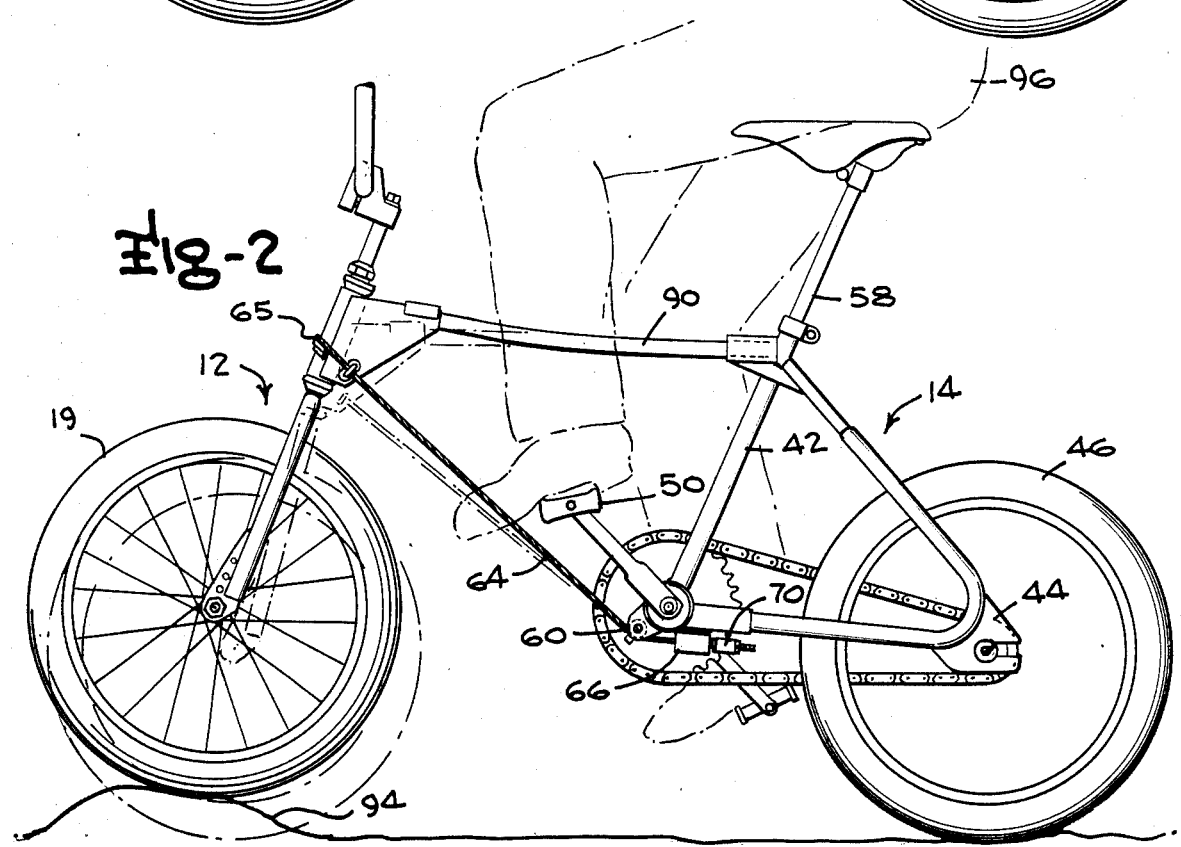

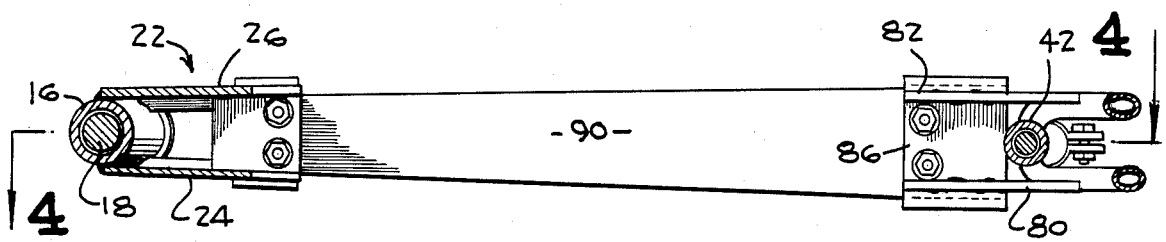
Fig-3
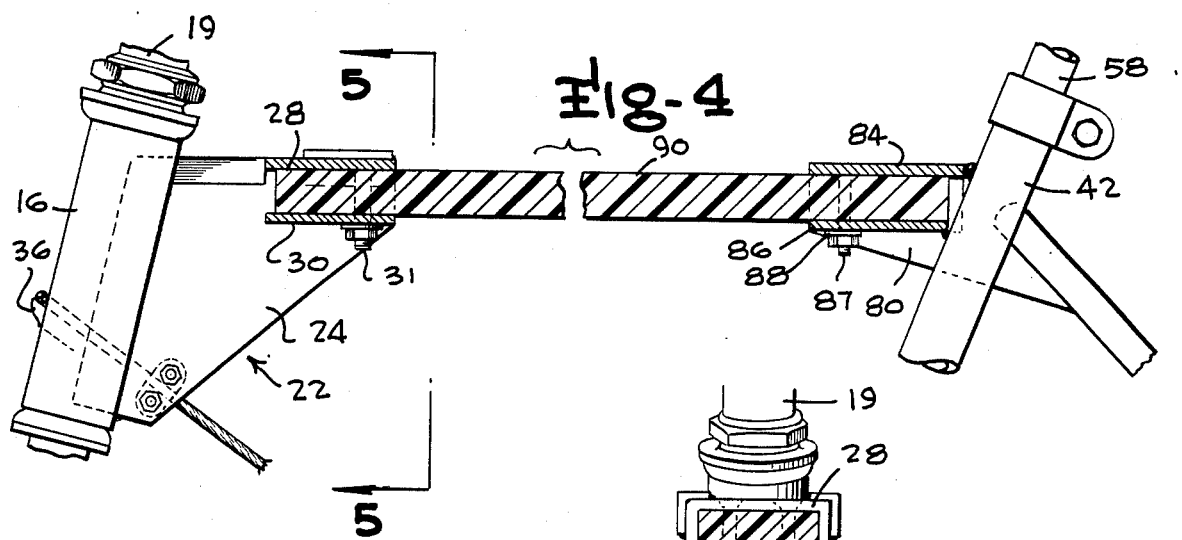
Fig-4
Fig-5
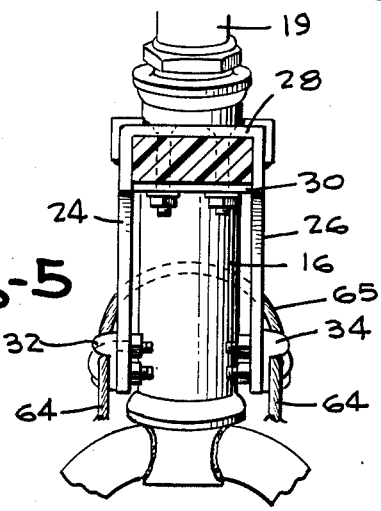
Fig-6
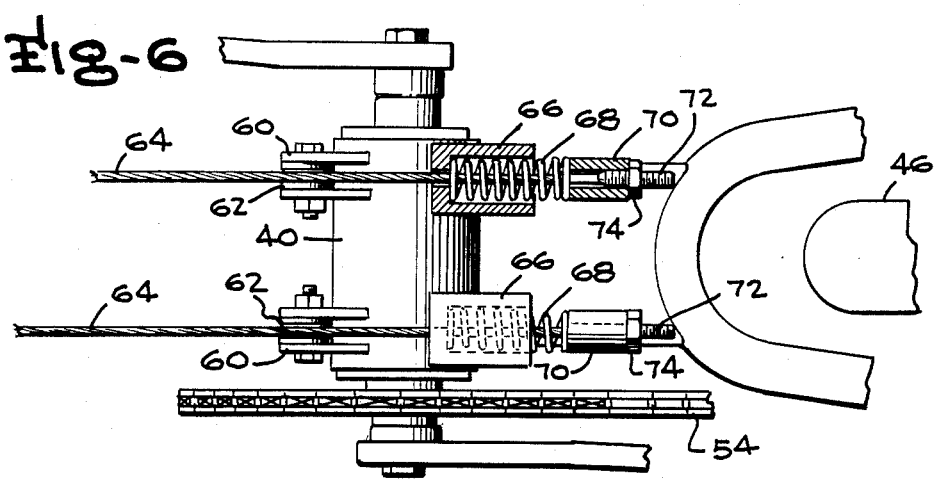

4,669,747

FLEXIBLE BICYCLE

BACKGROUND OF THE INVENTION

The present invention is in the field of manned vehicles, and is more specifically directed to the field of bicycles.

Most conventional bicycles comprise a rigid frame with the front and rear wheel being fixedly connected to the frame so that the rider is subjected to a rigid and unyielding support which can be uncomfortable when the bicycle is ridden across rough surfaces. While the spring mounting of the front wheel of a bicycle has been previously employed, the prior known constructions have suffered from a number of drawbacks such as being overly heayy, cumbersome, and expensive to fabricate. Another problem with the prior known bicycle constructions employing a flexible front wheel support is that they are frequently difficult or impossible to adjust to provide an optimum spring and ride characteristic for a particular rider. In other words, a heavier rider requires a different, more firm spring support than does a lighter rider. It has been difficult and frequently impossible to provide a ride adjustment with the previous known bicycle construction. The closest known prior patents in this field are: U.S. Pat. Nos. 433,172; 453,514; 463,710; 591,306; 602,034; 1,045,025; 3,990,717; 4,162,797; and 4,202,561.

Therefore, it is the primary object of the present invention to provide a new and improved bicycle construction.

SUMMARY OF THE INVENTION

Achievement of the foregoing object is enabled by the preferred embodiments of the invention through the provision of a bicycle having a front frame portion and a rear frame portion with the front frame portion including handlebars, a front wheel, and a front neck in which the wheel-mounting fork is positioned. The rear frame portion includes a rear wheel, a crank housing, a pedal crank mounted in the crank housing, and a conventional seat. A flexible connection is provided between the front frame portion and the rear frame portion by an elongated front to rear inwardly tapering fiberglass spring plate having a forward end mounted in a female type receptacle on the front frame portion and having a rearward end similarly mounted in a female type receptacle on the rear frame portion. A steel cable has both ends extending through a retainer bracket on the crank housing of the rear frame portion and extends upwardly in a loop about retaining means on the front frame portion. Compression springs engage the ends of the cable to maintain the cable in adjusted tension for controlling flexing of the elongated fiberglass spring plate. Ride adjustment can be achieved by adjusting the cable and by replacing the elongated fiberglass spring plate by another plate having different flexibility. In operation, the front frame portion flexes upwardly when the front wheel engages an obstacle so as to bend the fiberglass spring plate under the control of the opposite forces exerted by the spring-tension cable. The resultant construction is extremely light weight, and the bicycle can be disassembled quite easily for storage in a minimum amount of space by simply removing the elongated fiberglass spring plate.

A better understahding of the manner in which the preferred embodiments of the invention achieve the foregoing object will be enabled when the following detailed description is considered in conjunction with the appended drawings in which like reference numerals are used for the same parts as illustrated in the different figures of the drawings.

BRIEF DESCRIPTION OF THE DRAWING

FIG. 1 is a side elevation view of a first embodiment of the invention consisting of a riderless bicycle-type vehicle;

FIG. 2 is a side elevation view similar to FIG. 1 but illustrating the vehicle in use with a rider in position;

FIG. 3 is a sectional view taken along lines 3—3 of FIG. 1;

FIG. 4 is a sectional view taken along lines 4—4 of FIG. 3;

FIG. 5 is a sectional view taken along lines 5—5 of FIG. 4;

FIG. 6 is a sectional view taken along lines 6—6 of FIG. 1;

DESCRIPTION OF THE PREFERRED EMBODIMENTS

Figure 7:
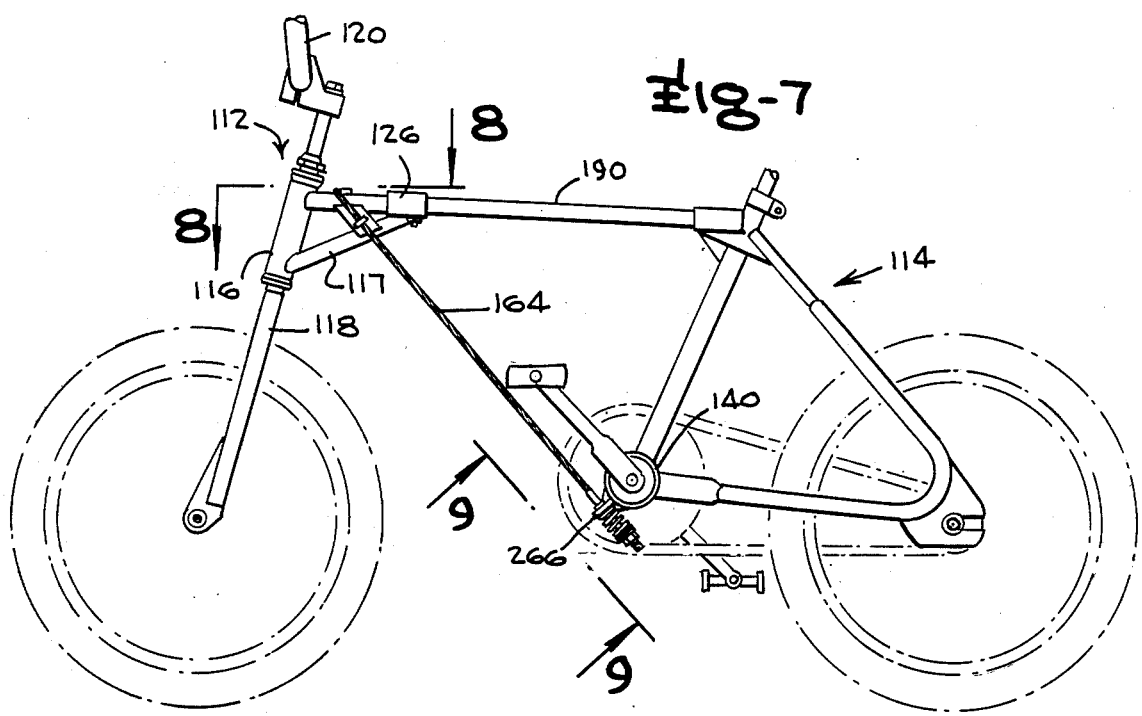
FIG. 7 is a side elevation view of a second embodiment of the invention.

Attention in initially invited to FIG. 1 of the drawings which illllustrates a first embodiment of the invention, generally designated 10, comprising a bicycle-type vehicle including a rigid metal front frame portion 12 and a rigid metal rear frame portion 14 which are connected by a less-rigid flexible connector portion 15.

The front frame portion 12 includes a front neck 16 which provides pivotal support for a conventional front fork 18 from which a neck 19 extends and is connected to handlebars 20 in a well-known conventional manner. A carrier bracket 22 extends rearwardly from the front neck 16 and includes first and second vertical bracket plates 24 and 26 between which an upper front retainer plate 28 and a lower front retainer plate 30 extend. Conventional cable clamps 32 and 34 are respectively mounted on the bracket plates 24 and 26 with a cable carrier lip 36 extending forwardly from the front surface of the front neck 16.

Rear frame portion 14 includes a crank supporting housing 40, a seat support tube 42 and wheel receiving attachment means 44 connected to a rear wheel 46. A conventional crank assembly 48 is mounted in the housing 40 and includes pedals 50 and a sprocket 52 about which a chain 54 extends with the rear end of the chain being fitted over a sprocket on the rear wheel 46 in a well known manner. Similarly, a seat 56 is mounted on the upper end of a seat post 58 received in the seat support tube 42.

The lower surface of the crank supporting housing 40 has roller support brackets 60 welded to its lower forward edge with the brackets 60 each providing support for a sheave 62 over which opposite ends of a steel cable 64 extend. The ends of the cable 64 respectively extend into anchor brackets 66 welded to the crank supporting housing 40. A loop 65 in the central portion of the cable extends about the front neck 16 with opposite ends of the loop being held by clamps 32 and 34. A coil compression spring 68 is provided in each anchor bracket 66 and has one end engaging a floating sleeve 70 through which the end of the cable 64 extends. The outer extremity of each end of the cable comprises a threaded rod 72 on which a nut 74 is threadably positioned for engagement with the outer end of the floating sleeve 70 so that tightening of the nut 74 acts against the compressive force of spring 68 to increase tension on cable 64 in an obvious manner as will be apparent from inspection of FIG. 6.

A pair of parallel bracket plates 80 and 82 are welded to the rear frame to extend forwardly of the seat support tube 42 as shown in FIG. 3 with upper and lower rear retainer plates 84 and 86 being supported on the bracket plates 80 and 82.

A flexible but strong connection is provided between the front frame portion 12 and the rear frame portion 14 by an elongated fiberglass spring plate 90 (FIG. 4) mounted between the upper front retainer plate 28 and lower front retainer plate 30 at its forward end with a retainer bolt 31 extending through the spring plate 90 for retaining same in fixed connection to the front frame portion. Similarly, the rear end portion of the fiberglass spring plate 90 is positioned between the upper rear retainer plate 84 and the lower rear retainer plate 86 and is clamped by means of tightening of nut 87 on bolt 89 as clearly shown in FIG. 4. It should be observed that the elongated fiberglass spring plate 90 tapers in width from rear to front as shown in FIG. 3. Thus, the elongated fiberglass spring plate 90 and the cable 64 constitute the only linkage between the front frame portion 12 and the rear frame portion 14.

The elongated flexible fiberglass spring plate 90 permits movement of the front frame portion relative to the rear frame portion with bending of the spring plate being possible as shown in FIG. 2 with the normal position of the frame being illustrated in phantom lines and the solid line position showing the effects of engagement of an obstacle 94 by the front wheel of the bicycle during operation by a rider 96. It should be observed that the cable 64 is maintained in a relatively taught condition so as to limit the amount of movement possible by the front frame portion. Moreover, there is a limit of movement of the cable provided by the compression of coil spring members 68 so that complete control of the flexing of the elongated fiberglass spring plate 90 is achieved even when the front wheel engages large objects or drops into potholes or the like creating substantial force on the front wheel.

A substantial advantage of the present invention is that the elongated fiberglass spring plate 90 can be removed and replaced by another spring plate having different spring characteristics. For example, if a heavier rider is using the bicycle it would be desirable to provide a stiffer spring plate than would be necessary for a lighter person. Removal and replacement of the spring plate can be easily achieved in a matter of minutes.

Figure 8:
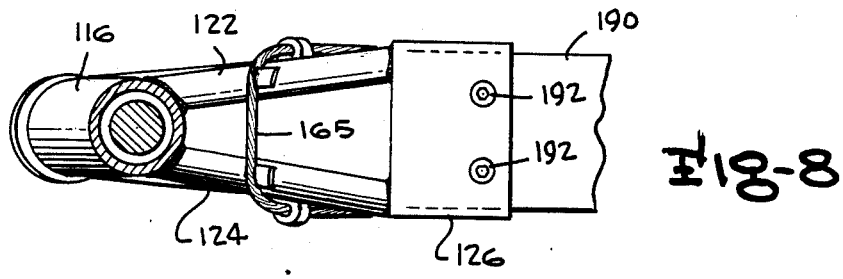
FIG. 8 is a sectional view taken along lines 8—8 of FIG. 7.
Figure 9:
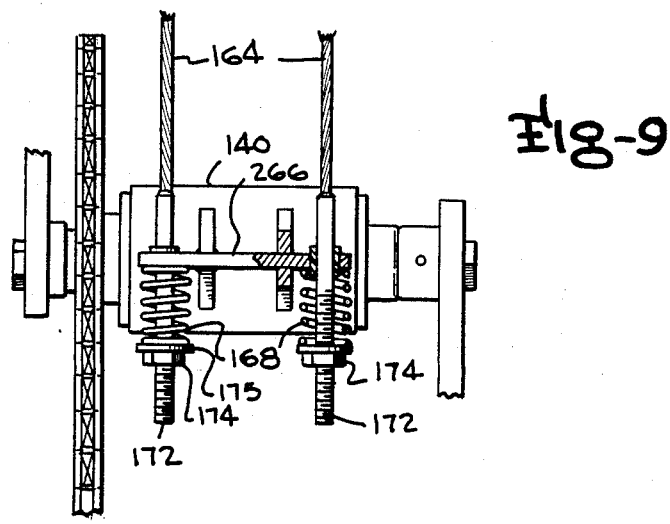
FIG. 9 is a sectional view taken along lines 9—9 of FIG. 7.

FIGS. 7, 8, and 9 illustrate a second embodiment of the invention similar to the first embodiment but employing an alternative, and more economical mounting of the steel cable extending between the front frame portion and the rear frame portion. More specifically, a front frame portion 112 includes a front neck 116 which supports a fork 118 and handlebars 120. Upper rearwardly extending front and rear bracket tubes 122 and 124 extend rearwardly from the front neck 116 and terminate at a hollow coupling housing 126 which receives the forward end of an elongated fiberglass spring plate 190 clampingly held in position by bolt and nut assemblies 192. A lower diagonal brace 117 also extends rearwardly from the front neck portion 116 and has its rear end welded to the coupling housing 126. A cable 164 has a central loop 165 which extends over the bracket tubes 122 and 124 and has its lower ends extending through an anchor plate 266 welded to the lower forward surface of a crank supporting housing 140 of the rear frame portion 114. Threaded rods 172 are attached to the ends of the cable 164 by crimping connections or the like with nut members 174 on the threaded rods engaging washers 175 which in turn engage the outer ends of compression springs 168 having opposite ends engageable with the anchor bracket 266. Thus, the compressive force of springs 168 acts against the nuts 174 with the amount of tension provided in the cable 164 being determined by the adjusted position of nut members 174.

In operation, the second embodiment is basically the same as the first embodiment.

Thus, it will be seen that the present invention provides a new and improved bicycle-type vehicle which can be comfortable to ride and which is versatile in permitting adjustment of its weight carrying capacity by selective usage of different spring plate members having different flexing capability. It should be understood that the invention is not limited to the specific preferred embodiments disclosed above in that numerous modifications will undoubtedly occur to those of skill in the art. For example, while a fiberglass spring plate member 90 is the preferred construction, it would also be possible to use different types of plastic materials or to use a metal spring plate in some instances. Moreover, while the cable members 64 and 164 would preferably be formed of stainless steel, other types of steel or other materials could be employed if desired. Therefore, the spirit and scope of the invention is to be limited solely by the appended claims.

I claim:

1. A bicycle comprising:
   a movable front frame portion including handlebars and a front neck supporting a front fork and a front wheel;
   a rear frame portion including a crank supporting housing, a seat support tube and rear wheel attachment means connected to a rear wheel;
   a flexible spring plate attached to and extending between an upper portion of the front frame portion and the rear frame portion, said front frame portion and said rear frame portion being flexibly movable relative to one another and free of rigid interconnection; and
   tensioned cable means extending in a taut condition between the front frame portion and a lower portion of the rear frame portion adjacent the crank supporting housing thereof and serving to locate said front frame portion relative to said rear frame portion.

2. A bicycle as recited in claim 1 wherein said front and rear frame portions respectively include front and rear retainer means which respectively removably receive front and rear ends respectively of the flexible spring plate so that different flexible fiberglass spring plates having different characteristics can be selectively mounted between the frame portions to achieve a desired effect.

3. A bicycle as recited in claim 1, wherein said front and rear frame portions respectively include front and rear retainer means which respectively removably receive front and rear ends respectively of the flexible spring plate so that different flexible spring plates having different flexibility characteristics can be selectively mounted between the frame portions to achieve a desired effect.

4. A bicycle as recited in claim 1 wherein said front and rear frame portions respectively include front and rear retainer means which respectively removably receive front and rear ends respectively of the flexible spring plate so that different flexible spring plates having different characteristics can be selectively mounted between the frame portions to achieve a desired effect and wherein said flexible spring plate has inwardly tapering sides from rear to front.

5. A bicycle as recited in claim 1 wherein said front and rear frame portions respectively include front and rear female type retainer means which respectively matingly removably receive front and rear ends respectively of the flexible spring plate so that different flexible spring plates having different characterisitics can be selectively mounted between the frame portions to achieve a desired effect and wherein said flexible spring plate tapers inwardly from rear to front.

6. A bicycle as recited in claim 1 wherein said front and rear frame portions respectively include front and rear female type retainer means which respectively matingly removably receive front and rear ends respectively of the flexible spring plate so that different flexible spring plates having different characteristics can be selectively mounted between the frame portions to achieve a desired effect and wherein said flexible spring plate has inwardly tapering sides from rear to front.

7. A bicycle as recited in claim 1 wherein said rear frame portion includes a crank supporting housing, anchor bracket means mounted on said crank supporting housing, spring means engaging said anchor bracket means and opposite ends of said cable for exerting tension on said cable and means for permitting the adjustment of the tension in said cable.

8. A bicycle as recited in claim 1 wherein a center portion of said cable extends in a loop about the forward surface of a front neck portion of said front frame portion and additionally including clamping means for clamping said cable at opposite ends of said loop at a location immediately rearwardly adjacent said front neck portion.

9. A bicycle as recited in claim 7 wherein said cable has a center portion extending in a loop around bracket means extending rearwardly of a front neck portion of said front frame portion.

10. A bicycle as recited in claim 7 wherein said front and rear frame portions respectively include front and rear retainer means which respectively removably receive front and rear ends respectively of the flexible spring plate so that different flexible spring plates having different flexibility characteristics can be selectively mounted between the frame portions to achieve a desired effect.

11. A bicycle as recited in claim 7 wherein said front and rear frame portions respectively include front and rear retainer means which respectively removably receive front and rear ends respectively of the flexible fiberglass spring plate so that different flexible fiberglass spring plates having different characteristics can be selectively mounted between the frame portions to achieve a desired effect and wherein said flexible spring plate has inwardly tapering sides from rear to front.

12. A bicycle as recited in claim 7 wherein said front and rear frame portions respectively include front and rear female type retainer means which respectively matingly removably receive front and rear ends respectively of the flexible fiberglass spring plate so that different flexible fiberglass spring plates having different characteristics can be selectively mounted between the frame portions to achieve a desired effect and wherein said flexible fiberglass spring plate tapers inwardly from rear to front.

13. A bicycle as recited in claim 12 wherein a center portion of said cable extends in a loop about the forward surface of a front neck portion of said front frame portion and additionally including clamping means for clamping said cable at opposite ends of said loop at a location immediately rearwardly adjacent said front neck portion.

14. A bicycle as recited in claim 12 wherein said cable has a center portion extending in a loop around bracket tube means extending rearwardly of a front neck portion of said front frame portion.

* * * * *